(No Model.)
W. C. PERKINS.
SCREW OR DRIVE HOOK.
No. 316,650. Patented Apr. 28, 1885.
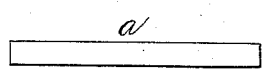
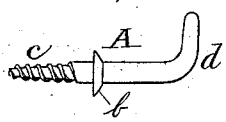
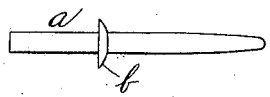
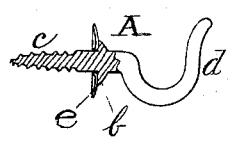
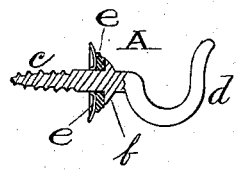
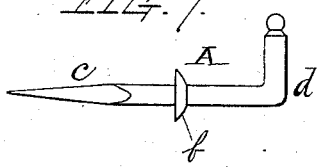
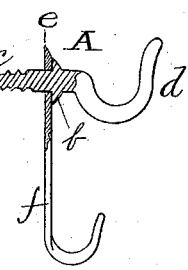
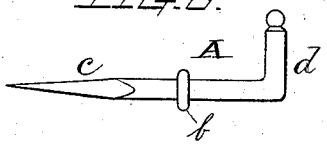
Witnesses;
Walter B. Nourse,
Lucius W. Briggs.
Inventor;
William C. Perkins,
By Albert A. Barker,
Attorney
N. PETERS. Photo-Lithographer. Washington. D. C.

UNITED STATES PATENT OFFICE.

WILLIAM C. PERKINS, OF WORCESTER, MASSACHUSETTS, ASSIGNOR TO THE WIRE GOODS COMPANY, OF SAME PLACE.

SCREW OR DRIVE HOOK.

SPECIFICATION forming part of Letters Patent No. 316,650, dated April 28, 1885.

Application filed January 27, 1885. (No model.)

*To all whom it may concern:*

Be it known that I, WILLIAM C. PERKINS, of Worcester, in the county of Worcester and State of Massachusetts, have invented certain new and useful Improvements in the Art of Making Screw or Drive Hooks; and I do hereby declare that the following is a full, clear, and exact description of the same, reference being had to the accompanying drawings, forming a part of this specification, and in which—

Figure 1 represents a short section of ordinary wire of the proper size, length, and material for making one of my aforesaid improved screw or drive hooks. Fig. 2 represents the wire illustrated in Fig. 1 with the stop ring or base formed thereon preparatory to forming the hook end and screw upon the same, as hereinafter more fully described. Fig. 3 represents one of my improved screw-hooks finished and ready for use; and Figs. 4, 5, 6, 7, and 8 represent modifications, which will be hereinafter more fully explained.

The object of my invention is to provide what are known to the trade as "screw and drive hooks" having a stop-ring or base thereon, in a more permanent form and at less expense than those now in use; and it consists in making the screw or drive end and hook, as well as the stop-ring or base, (constituting said screw or drive hooks,) all in one part from a straight piece of wire or rod of the proper size, length, and material, in the manner hereinafter more fully described.

Previous to my invention screw and drive hooks having a stop-ring or base thereon have been made either by casting the hook end, stop-ring or base, and screw or drive end in one part from suitable metal, or by casting the hook end and stop-ring or base in one part and then fastening a separate screw or drive part in the end of the aforesaid casting.

It is obvious that a screw or drive hook made in one casting, as first described, is not satisfactory, especially on account of the two following reasons: first, that the screw or pointed end being made of cast metal, and consequently brittle, is very easily broken off when applied to practical use; and, second, that when the hook is provided with a screw end said screw, being imperfectly formed, cannot be readily inserted, especially into hard wood, and does not present so neat an appearance as though it were formed by cutting instead of casting it in the metal.

By the second method described of fastening a separate screw or drive end in the end of a casting a much superior hook than the other, which is wholly cast, is produced; but even this is objectionable on account of the extra expense necessitated in fitting and fastening the two separate parts together.

A screw or drive hook make in accordance with my invention obviates to a large extent the objections hereinbefore described, being not only more durable, but less expensive to make, as will readily be seen from the following description.

To enable those skilled in the art to which my said invention appertains to make and use the same, I will proceed to describe it more in detail.

In the drawings, the part marked $a$ represents a short straight piece of wire of the proper size, length, and material for making one of my improved screw or drive hooks A. In making said hook A the stop-ring or base $b$ is first formed upon the wire $a$, as shown in Fig. 2, by raising or forcing up a portion of the surface of the wire and compressing it into the shape required for said ring or base, as shown in the drawings. Said raised portion may be formed by pushing forward a portion of the outer surface of the wire from either direction toward the center, and compressing the same into any desired shape by means of suitable dies or in any other convenient and well-known manner while in either a cold or heated state, as preferred. Said stop-ring or base, it will be understood, is for the purpose of governing the depth to which the screw or drive end is inserted to strengthen or stiffen the hook when fastened in position and to add to its ornamentation.

After having formed the stop-ring or base $b$ on the wire $a$, as before described, the threaded or pointed end $c$ and bent hook $d$ are then formed on the same in the usual manner, thus completing my improved screw or drive hook, ready for use. Said completed hook, as will be seen, presents a very neat and tasty appearance, and when combined with one or more washers, e, as shown in Figs. 3 and 4, various designs may be produced to add to the ornamentation of the same. I therefore reserve the right to use my said improved screw or drive hook with one or more of said washers e, or with a washer having a supplemental hook, f, suspended therefrom, as shown in Fig. 6. I also reserve the right to make the hook of any desired size, shape, or design other than those shown in the drawings.

I am aware it is not new to make a screw or drive hook in one part from a piece of wire or rod having no stop-ring or base thereon, and, also, that it is not new to form a raised portion on metal in the manner hereinbefore described, and therefore make no claim, independently or broadly, to either of such features.

What I do claim as new and of my invention, and desire to secure by Letters Patent, is—

1. In the art of making screw or drive hooks having a stop-ring or base thereon, the method of forming the screw or drive end and hook, as well as the stop-ring or base, all in one part from a single piece of wire or rod, substantially as shown and described.

2. The combination, with the screw or drive end and hook of a screw or drive hook made from a single piece of wire or rod, of a stop-ring or base made by raising or forcing up and compressing a portion of the surface of said wire or rod, substantially as shown and described.

3. The combination of a screw or drive hook made from a single piece of wire or rod with a stop-ring or base made by raising or forcing up and compressing a portion of the surface of said wire or rod, and one or more washers interposed between said stop-ring or base and the part to which the hook is attached, substantially as and for the purpose set forth.

4. The combination of a screw or drive hook made from a single piece of wire or rod and having a raised ring or base formed thereon, with one or more washers interposed between said ring or base and the part to which the hook is attached, substantially as and for the purpose set forth.

WILLIAM C. PERKINS.

Witnesses:
ALBERT A. BARKER,
LUCIUS W. BRIGGS.